(12) United States Patent
Ito et al.

(10) Patent No.: US 7,340,559 B2
(45) Date of Patent: Mar. 4, 2008

(54) MEMORY PRODUCT CONTROLLER, MEMORY PRODUCT CONTROL METHOD, AND MEMORY PRODUCT

(75) Inventors: Hidenobu Ito, Kawasaki (JP); Katsutoshi Yano, Kawasaki (JP); Isamu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 311 days.

(21) Appl. No.: 11/256,932

(22) Filed: Oct. 25, 2005

(65) Prior Publication Data

US 2006/0280007 A1 Dec. 14, 2006

(30) Foreign Application Priority Data

Jun. 9, 2005 (JP) ............................. 2005-169922

(51) Int. Cl.
*G06F 12/00* (2006.01)
*G06F 13/00* (2006.01)
*G06F 13/28* (2006.01)
*G06F 3/00* (2006.01)
*G11C 7/00* (2006.01)

(52) U.S. Cl. ..................... 711/103; 711/154; 711/156; 711/170; 365/192; 710/1; 710/8

(58) Field of Classification Search ................. 711/103
See application file for complete search history.

(56) References Cited

U.S. PATENT DOCUMENTS

2004/0212480 A1* 10/2004 Carrender et al. ....... 340/10.42
2006/0056832 A1* 3/2006 Yamaguchi et al. .......... 396/56

FOREIGN PATENT DOCUMENTS

JP 2002-288598 10/2002
JP 2004-192539 7/2004

OTHER PUBLICATIONS

Hu, Ying. Supporting RFID-based Item Tracking Applications in Oracle DBMS Using a Bitmap Datatype. 31st VLDB Conference. 2005.*

* cited by examiner

*Primary Examiner*—Brian R. Peugh
*Assistant Examiner*—Ryan Bertram
(74) *Attorney, Agent, or Firm*—Arent Fox LLP (57) ABSTRACT

To provide a memory product controller, a memory product control method, and a memory product storing a computer program, capable of realizing a multi-function memory product, without increasing the cost, by grouping a plurality of memory products. In a memory product controller, information identifying a memory product and an operating condition of the memory product are stored in association with information identifying a group, and when reading/writing is performed on one memory product belonging to a predetermined group by a reader/writer for a memory product, reference is made to an operating condition storage unit, and when other memory products having the similar operating condition are present in the same group, instruction information to perform reading or writing on one or a plurality of other memory products belonging to the same group and having the similar operating condition is transmitted to the reader/writer.

12 Claims, 10 Drawing Sheets

OPERATING CONDITION DATABASE — 252

| GROUP ID | TAG ID | OPERATING CONDITION ID | PROCESS |
|---|---|---|---|
| xxxx | xxxxxx<br>xxxxxx<br>xxxxxx<br>xxxxxx | xxx<br>xxx<br>xxx<br>xxx | READ<br>WRITE<br>READ<br>READ |
| oooo | oooooo<br>oooooo | ooo<br>ooo | READ<br>WRITE |
| ⋮ | ⋮ | ⋮ | ⋮ |

MEMORY PRODUCT CONTROLLER, MEMORY PRODUCT CONTROL METHOD, AND MEMORY PRODUCT

CROSS-REFERENCE TO RELATED APPLICATION

This non-provisional application claims priority under 35 U.S.C. §119(a) on Patent Application No. 2005-169922 filed in Japan on Jun. 9, 2005, the entire contents of which are hereby incorporated by reference.

BACKGROUND OF THE INVENTION

The present invention relates to a memory product controller, a memory product control method and a memory product, capable of causing a plurality of memory products, such as IC tags, as a whole to function as a high-performance memory product by combining them.

With the recent diversification of memory means, not only simple memory products, but also many memory products having various functions by incorporating an IC chip into removable memory products, such as IC cards and IC tags, have been developed. The application range of such memory products is expanding to various applications.

Moreover, the mainstream of IC tags is non-contact type IC tags, such as RFID (Radio Frequency-Identification) tags, that can transmit and receive data by wireless communication to/from a reader/writer (antenna+controller) capable of reading/writing in a non-contact manner. Since the RFID can transmit and receive data by holding an IC tag over the reader/writer, the fields to which such IC tags are applicable are expanding.

However, an RFID tag has a physical limitation for multi-functionality since the RFID tag can not obtain a necessary amount of power to operate by itself when providing an RFID tag with various functions. It follows that all we ca do is to make the restricted multi-function RFID tag. Therefore, as shown in Japanese Patent Application Laid-Open No. 2004-192539 and No. 2002-288598, for example, many techniques have been developed to realize a multi-function memory product by grouping a plurality of RFID tags and regarding one group as a single IC tag.

BRIEF SUMMARY OF THE INVENTION

The present invention has been made with the aim of solving the above problems, and it is an object of the present invention to provide a memory product controller, a memory product control method and a memory product, capable of realizing a multi-function memory product, without increasing the cost, by grouping a plurality of memory products.

Another object of the invention is to provide a memory product controller, a memory product control method and a memory product, capable of detecting a memory product that does not function correctly and stopping the use of the memory product, or using redundant other memory product having the similar function.

In order to achieve the above objects, a memory product controller according to a first aspect of the invention is a memory product controller which groups a plurality of non-contact type memory products and controls the memory products to realize a predetermined function, and characterized by comprising: a group registration unit for storing information identifying a memory product in association with information identifying a group; an operating condition storage unit for storing the information identifying a memory product, an operating condition of the memory product, and information indicating to perform reading or writing on the memory product when the memory product is determined that it is on the operating condition, in association with the information identifying a group; a reader/writer for a memory product; means for referring to the operating condition storage unit, when reading/writing is performed on one memory product belonging to a predetermined group by the reader/writer, by using the information identifying said one memory product on which reading/writing is performed as key information, and determining whether or not other memory products having the similar operating condition are present in the same group; and means for transmitting instruction information to perform reading or writing on one or a plurality of other memory products belonging to the same group and having the similar operating condition to the reader/writer when the above means determines that other memory products having the similar operating condition are present.

A memory product controller according to a second aspect of the invention is based on the first aspect, and characterized in that a plurality of sets of memory products, as one set consisting of two or more memory products having the similar function, are grouped, and the memory product controller comprises: means for transmitting a predetermined signal to memory products through the reader/writer; determining means for determining whether or not there is a response to the transmitted signal from each memory product; and means for transmitting to the reader/writer instruction information to perform reading or writing on other memory products belonging to the same set as one memory product determined to be non-responsive by the determining means.

A memory product controller according to a third aspect of the invention is based on the second aspect, and characterized by comprising means for stopping transmission of instruction information to perform reading or writing on a memory product determined to be non-responsive by the determining means.

A memory product control method according to a fourth aspect of the invention is a memory product control method, which groups a plurality of non-contact type memory products and controls the memory products to realize a predetermined function, and characterized by comprising the steps of storing information identifying a memory product in association with information identifying a group; storing the information identifying a memory product, an operating condition of the memory product, and information indicating to perform either reading or writing on the memory product when the memory product is determined that it is on the operating condition, in association with the information identifying a group; when reading/writing is performed on one memory product belonging to a predetermined group by a reader/writer for a memory product, determining whether or not other memory products having the similar operating condition is stored in the same group by using the information identifying said one memory product on which reading/writing is performed as key information; and when a determination is made that other memory products having the similar operating condition are stored in the same group, transmitting instruction information to perform reading or writing on one or a plurality of other memory products belonging to the same group and having the similar operating condition to the reader/writer.

A memory product control method according to a fifth aspect of the invention is based on the fourth aspect, and characterized by grouping a plurality of sets of memory products, as one set consisting of two or more memory products having the similar function; transmitting a predetermined signal to memory products through the reader/writer; determining whether or not there is a response to the transmitted signal from each memory product; and transmitting to the reader/writer instruction information to perform reading or writing on other memory products belonging to the same set as one memory product determined to be non-responsive.

A memory product control method according to a sixth aspect of the invention is based on the fifth aspect, and characterized by stopping transmission of instruction information to perform reading or writing on a memory product determined to be non-responsive.

A memory product storing a computer program according to a seventh aspect of the invention is a memory product storing a computer program executable by a memory product controller which groups a plurality of non-contact type memory products and controls the memory products to realize a predetermined function, the memory product controller comprising a group registration unit for storing information identifying a memory product in association with information identifying a group, and an operating condition storage unit for storing the information identifying a memory product, an operating condition of the memory product, and information indicating to perform either reading or writing on the memory product when the memory product is determined that it is on the operating condition, in association with the information identifying a group, and characterized by causing the memory product controller to function as means for referring to the operating condition storage unit by using the information identifying one memory product on which reading/writing is performed as key information and determining whether or not other memory products having the similar operating condition are present in the same group, when reading/writing is performed on said one memory product belonging to a predetermined group by a reader/writer for a memory product, and means for transmitting instruction information to perform reading or writing on one or a plurality of other memory products belonging to the same group and having the similar operating condition to the reader/writer when the above means determines that other memory product having the similar operating condition are present in the same group.

A memory product storing a computer program according to an eighth aspect of the invention is based on the seventh aspect, and characterized by grouping and storing a plurality of sets of memory products, as one set consisting of two or more memory products having the similar function; and causing the memory product controller to function as means for transmitting a predetermined signal to memory products through the reader/writer, determining means for determining whether or not there is a response to the transmitted signal from each memory product, and means for transmitting to the reader/writer instruction information to perform reading or writing on other memory products belonging to the same set as one memory product determined to be non-responsive by the determining means.

A memory product storing a computer program according to a ninth aspect of the invention is based on the eighth aspect, and characterized by causing the memory product controller to function as means for stopping transmission of instruction information to perform reading or writing on a memory product determined to be non-responsive by the determining means.

In the first, fourth, and seventh aspects of the invention, information identifying a non-contact type memory product such as an IC tag is stored in association with information identifying a group, and the information identifying a memory product, an operating condition of the memory product, and information indicating whether to perform reading or writing on the memory product if the memory product has the operating condition, are stored in association with the information identifying a group. In case that reading/writing is performed on one memory product belonging to a predetermined group by the reader/writer, a determination is made as to whether or not other memory product having the similar operating condition is present in the same group by using the information identifying one memory product on which reading/writing is performed as key information, and when other memory products having the similar operating condition are determined to be present, instruction information to perform reading or writing on one or a plurality of other memory products belonging to the same group and having the similar operating condition is transmitted to the reader/writer. Thus, when it is detected that reading/writing is performed on a predetermined memory product by the reader/writer for a memory product, it is possible to determine, based on the fact that the reading/writing is performed, whether or not a memory product matching the stored operating condition is present in the same group, and, for example, it is possible to operate memory products in a linked manner without describing a determination program in the application program. Moreover, since there is no particular restriction on the functions to be linked, it is possible to freely combine a plurality of memory products to provide a multi-function memory product.

In the second, fifth and eighth aspects of the invention, a plurality of sets of memory products, as one set consisting of two or more memory products having the similar function, are grouped, a predetermined signal is transmitted to memory products, and a determination is made as to whether or not there is a response to the transmitted signal from each memory product. If there is no response from a predetermined memory product, a determination is made that some trouble has occurred in the memory product, and instruction information to perform reading/writing on other memory products (having the similar function) in the same set as the memory product are transmitted. Accordingly, by including two or more memory products having the similar function when grouping memory products, it is possible to obtain redundant functions, and therefore, even when one memory product has abnormality and can not function correctly, it is possible to operate the application program correctly by using other memory product having the similar function.

In the third, sixth and ninth aspects of the invention, transmission of instruction information to perform reading/writing on a memory product determined to be non-responsive is stopped. Therefore, it is possible to stop the use of a memory product that has abnormality and cannot function correctly, and it is possible to prevent an erroneous operation of the application program.

According to the first, fourth, and seventh aspects of the invention, when it is detected that reading/writing is performed on a predetermined memory product by the reader/writer for a memory product, it is possible to determine, based on the fact that the reading/writing is performed, whether or not a memory product matching the stored operating condition is present in the same group, and, for example, it is possible to operate memory products in a linked manner without describing a determination program in the application program. Moreover, since there is no particular restriction on the functions to be linked, it is possible to freely combine a plurality of memory products to provide a multi-function memory product.

According to the second, fifth and eighth aspects of the invention, by including two or more memory products having the similar function when grouping memory products, it is possible to obtain redundant functions, and therefore, even when one memory product has abnormality and can not function correctly, it is possible to operate the application program correctly by using other memory products having the similar function.

According to the third, sixth and ninth aspects of the invention, it is possible to stop the use of a memory product that has abnormality and cannot function correctly, and consequently it is possible to prevent an erroneous operation of the application program.

The above and further objects and features of the invention will more fully be apparent from the following detailed description with accompanying drawings.

DETAILED DESCRIPTION OF THE INVENTION

In the above-described conventional grouping of RFID tags, since individual RFID tags are just included in one group, it is necessary to change the application program in order to operate them in a linked manner. Thus, when combining a plurality of functions, there is the problem that the functions that can be combined are limited. For example, it is possible to construct a pseudo large-capacity memory product by combining a plurality of RFID tags incorporating a memory and having a data storage function. On the other hand, when constructing a multi-function application by combining a plurality of RFID tags incorporating a plurality of sensors, it is necessary to transfer information detected by the sensors to the application program because respective tags doesn't know when they work. Thus, it is fundamentally the same as in operating and controlling a plurality of RFID tags by the application program without grouping them.

Moreover, when realizing one function by combining a plurality of RFID tags, it is necessary to manage whether or not the RFID tags function correctly. However, in the above-mentioned conventional grouping method of RFID tags, there is no means for checking whether or not each of the RFID tags functions correctly, and if the presence of an abnormal tag is detected, there is the problem that the application program is not executable.

The present invention has been made with the aim of solving the above problems, and it is an object of the present invention to provide a memory product controller, a memory product control method, and a memory product storing a computer program, capable of realizing a multi-function memory product, without increasing the cost, by grouping a plurality of memory products.

It is also an object of the invention to provide a memory product controller, a memory product control method, and a memory product storing a computer program, capable of detecting a memory product that does not function correctly and stopping the use of the memory product, or using redundant other memory product having the similar function. The present invention is realized by the following embodiments.

Embodiment 1

Figure 1:
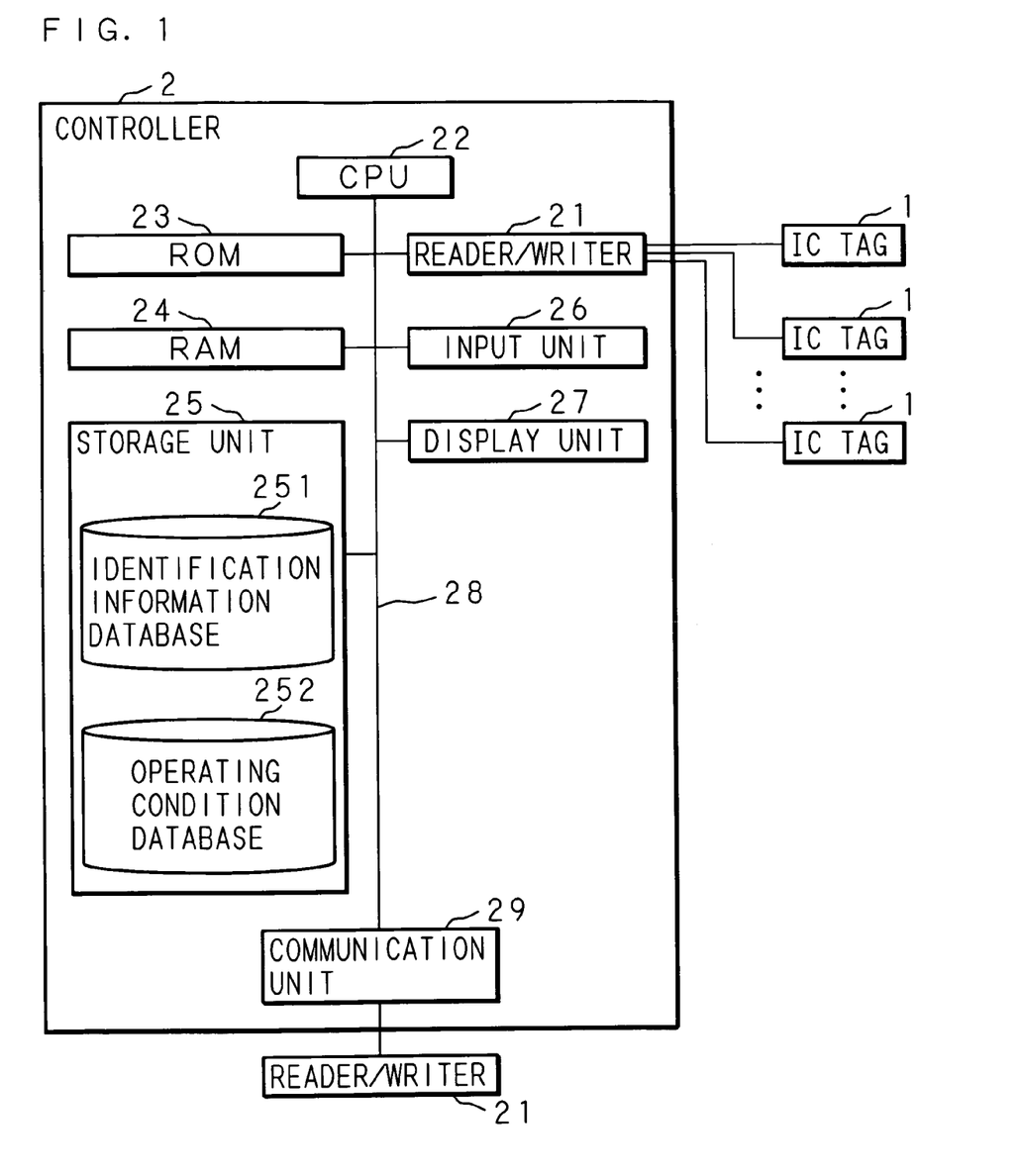
FIG. 1 is a block diagram showing the structure of a memory product controller of Embodiment 1 of the present invention.

The following description will describe in detail the present invention, based on the drawings illustrating Embodiment 1 thereof. FIG. 1 is a block diagram showing the structure of a memory product controller of Embodiment 1 of the present invention. The memory product controller of Embodiment 1 is a controller 2 comprising a reader/writer 21 for writing information on a plurality of IC tags (memory products), 1, 1, . . . to be attached to an object, or for reading information from a plurality of IC tags 1, 1, . . . . Note that, in this embodiment, the memory products are not limited to IC tags, and may be any memory products capable of reading/writing data in a non-contact manner.

Moreover, the controller 2 is not limited to the structure comprising the reader/writer 21, and, needless to say, the reader/writer 21 and the controller 2 may be physically separate devices and connected through a communication line, such as a RS232C cable and a USB cable, to enable transmission and reception of data by a communication unit 29.

The controller 2 comprises at least a CPU 22, a ROM 23, a RAM 24, a storage unit 25, an input unit 26 for receiving an input of information, and a display unit 27 for displaying and outputting information in addition to the reader/writer 21.

The CPU 22 is connected to the above-mentioned hardware units in the controller 2 through an internal bus 28, controls the respective hardware units, refers to a processing program, for example, a program for assigning an individual identification number to each IC tag stored in the ROM 23 and assigning group identification information for identifying the assigned identification number as one group, a program for detecting the fact of reading/writing performed on an IC tag 1 by the reader/writer 21, and a later-described operating condition database 252 storing operating conditions of IC tags, and executes various kinds of software functions according to a program for transmitting to the reader/writer 21 instruction information to perform reading/writing on IC tags 1, 1, . . . having the similar operating condition and belonging to the same group.

The ROM 23 is composed of a flash memory, etc, and stores a processing program necessary for performing a function as an authentication unit 2. The RAM 24 is composed of SRAM, etc. and stores temporary data generated when executing software.

Figure 2:
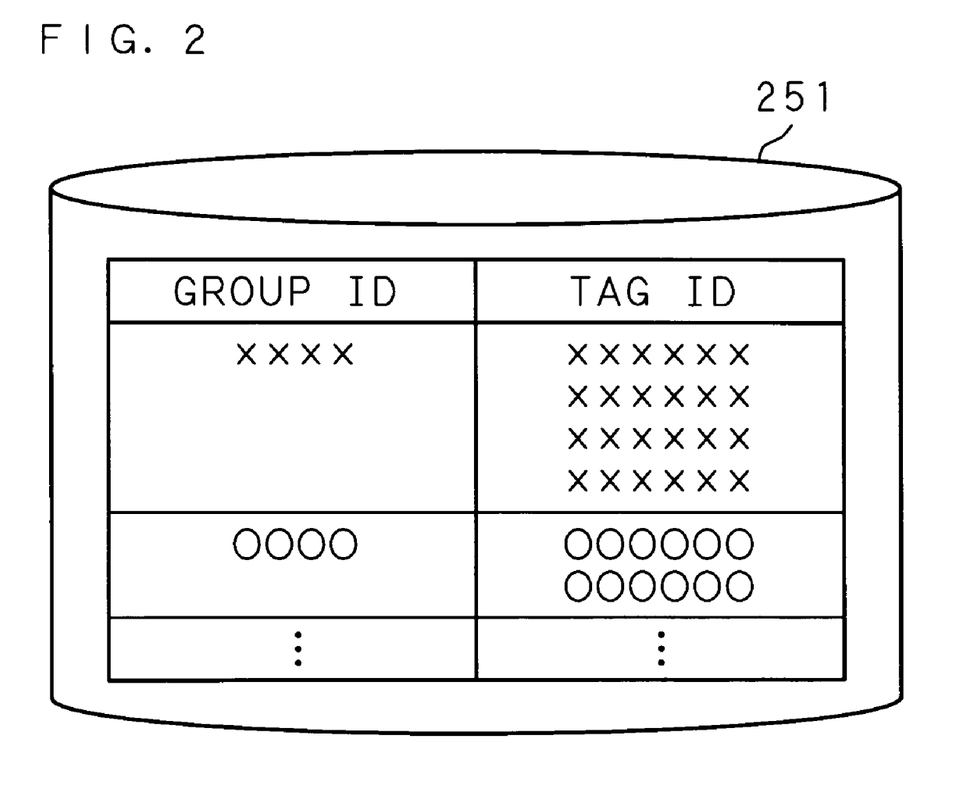
FIG. 2 is a view showing an example of the data structure of an identification information database.

The storage unit 25 comprises an identification information database 251 storing identification information such as tag ID identifying a plurality of IC tags 1, 1, . . . in association with group identification information identifying an group, for example, a group ID; and an operating condition database 252 storing operating conditions of the IC tags, 1, 1, . . . FIG. 2 is a view showing an example of the data structure of the identification information database 251. In the example of FIG. 2, the number of tag ID included in one group ID and the tag ID of each IC tag are stored.

Figure 3:
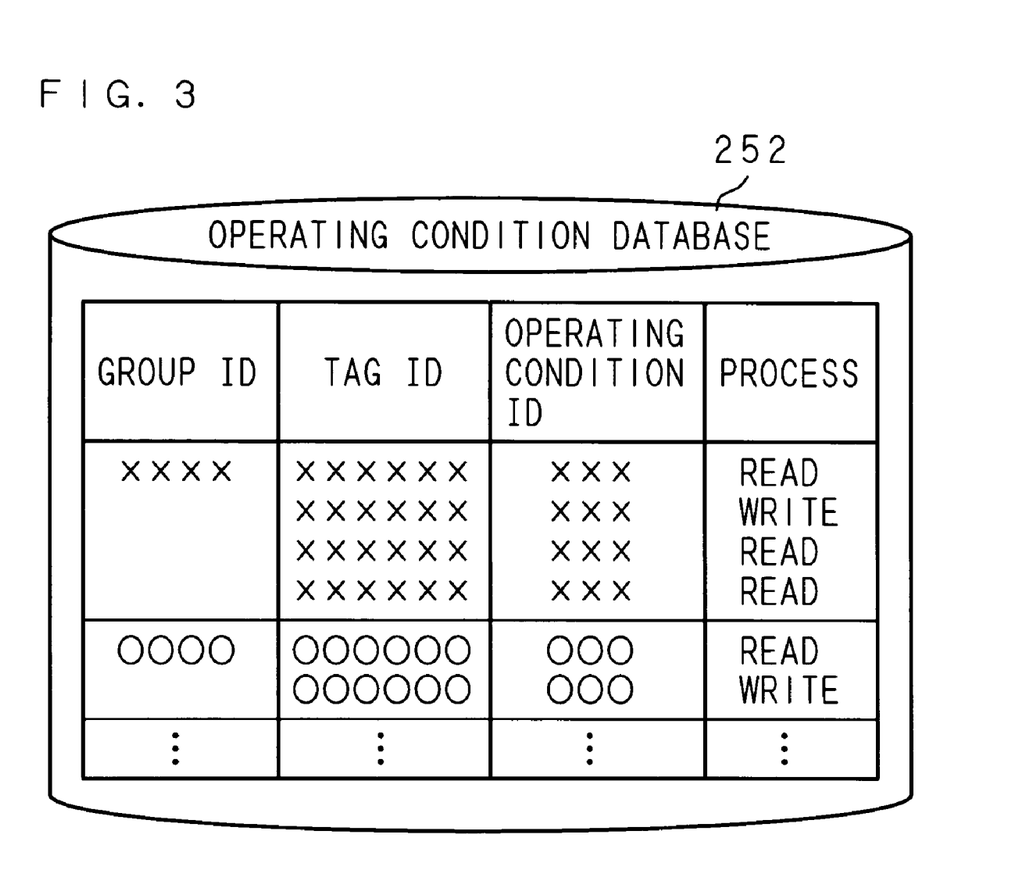
FIG. 3 is a view showing an example of the data structure of an operating condition database.

FIG. 3 is a view showing an example of the data structure of the operating condition database 252. In the example of FIG. 3, for each group ID, the tag ID included in one group ID, operating condition ID as information identifying the operating condition of each tag ID, a process corresponding to the operating condition ID, for example, whether to read data from a storage unit 112 or write data into the storage unit 112, are stored. The operating condition is, for example, a condition where data was read from an IC tag in the same group, a condition where data was written on an IC tag in the same group, a condition where tag ID in the same group was detected, etc. and is identified by each operating condition ID. The operating condition is not particularly limited to these conditions, and may be any condition that can be detected by the controller 2 by the operation of the reader/writer 21.

The input unit 26 is an input device such as a keyboard and a mouse, and defines the assignment of identification information. The display unit 27 is information display means such as a liquid crystal panel for displaying and outputting an image, and an LED display for displaying numerals, etc.

The operation of a memory product controller of Embodiment 1 having the above-described structure will be explained. The following description explains the case where the memory product controller of Embodiment 1 is applied to a product temperature management system for reading/writing a tag according to an instruction from an external application.

The product temperature management application operates the IC tags 1, 1, . . . through the controller 2 of the memory product controller of Embodiment 1. The IC tags 1, 1, . . . are RFID tags, and grouped by arranging a tag 1a including a temperature sensor and a tag 1b including a memory into one group.

A reader/writer 21a for reading/writing data on the tag 1a including a temperature sensor is mounted outside through the communication unit 29. When a read request (read) is received from the communication unit 29, the reader/writer 21a returns the detected temperature data to the communication unit 29. A reader/writer 21b for reading/writing data on the tag 1b including a memory can read and write data on the incorporated memory.

When the CPU 22 receives a check request (check) from an external application, the controller 2 records the temperature data at the time of reception. The controller 2 returns information regarding whether or not the temperature data has been recorded to the external application. The external application is a program for transmitting a check request (check) at fixed time intervals to the controller 2 and recording the history data of temperature.

Figure 4:
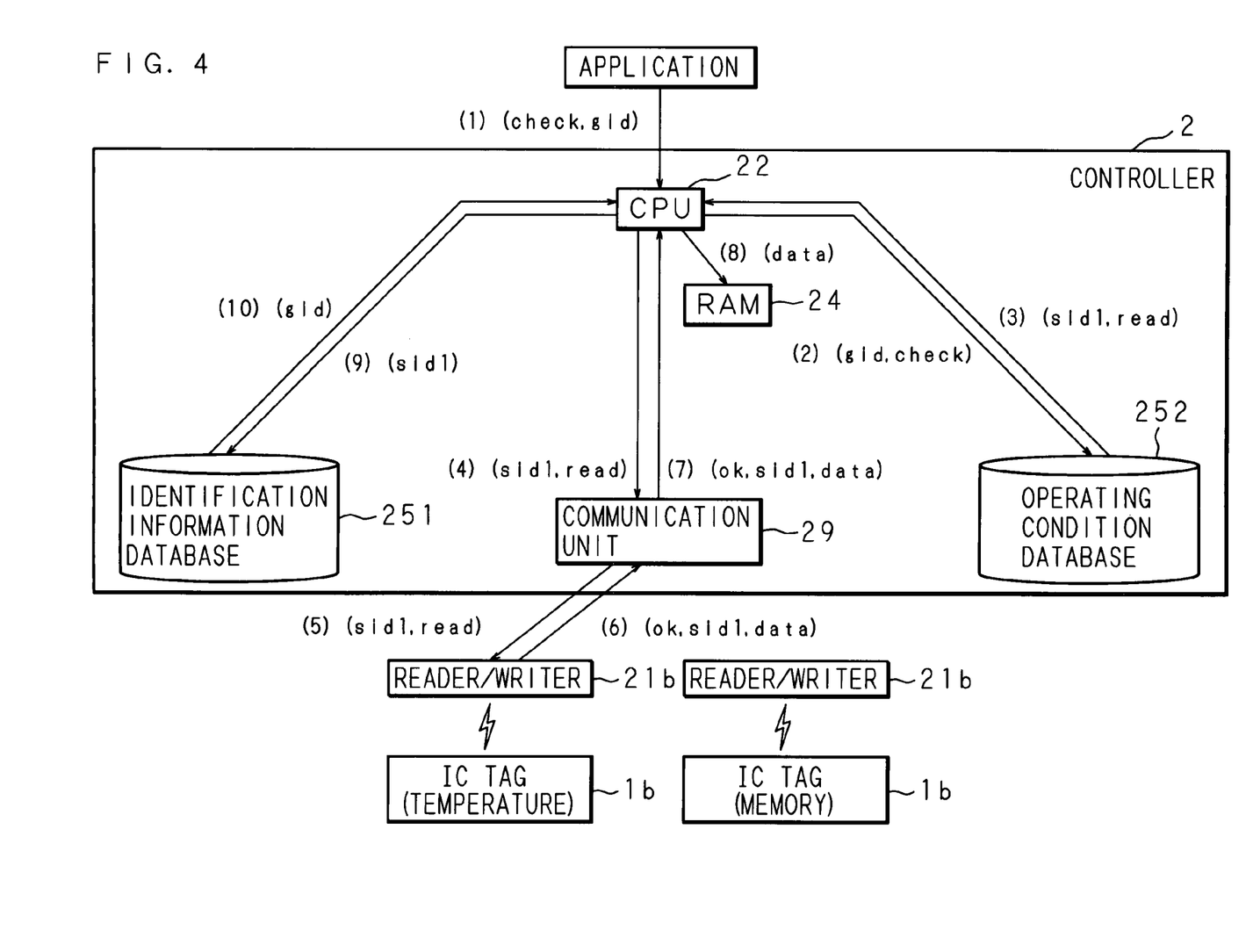
FIG. 4 is a view showing a dataflow in the memory product controller of Embodiment 1 of the present invention.
Figure 5:
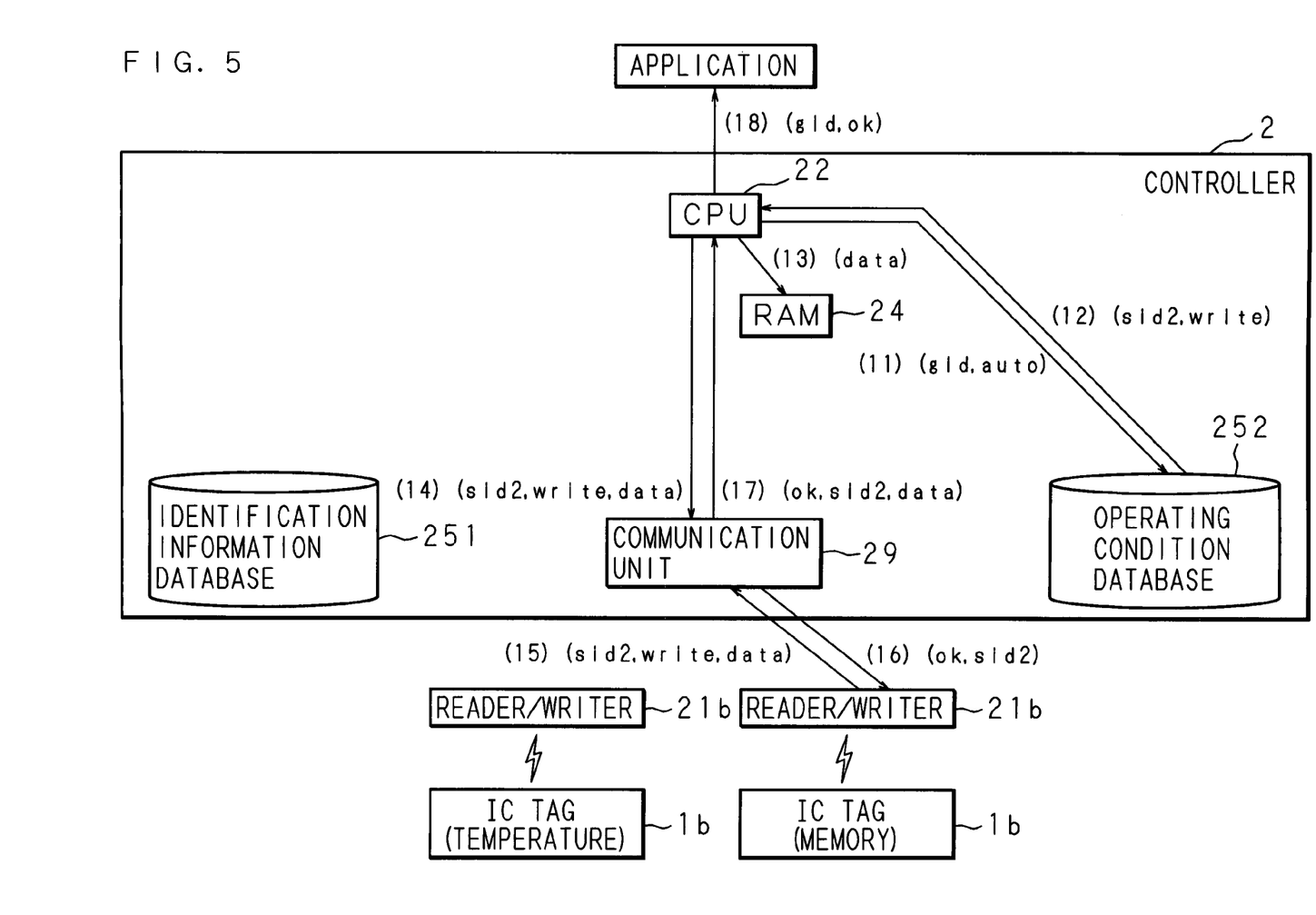
FIG. 5 is a view showing a dataflow in the memory product controller of Embodiment 1 of the present invention.

FIG. 4 and FIG. 5 are views showing a dataflow in the memory product controller of Embodiment 1 of the present invention. sid1 is the tag ID of an IC tag including a temperature sensor, sid2 is the tag ID of an IC tag including a memory, gid is group ID to be assigned to the grouped tags, check is a check request command from an external application, read/write is a read/write command to the reader/writer, and data is temperature data read by the temperature sensor. auto is a kind of command indicating the fact of reading data from a tag. The check, read, write, and auto are used as operating condition ID of the operating condition database 252.

As shown in FIG. 4, the external application transmits a check request command (check) and group ID (gid) to be checked to the controller 2 (1). The CPU 22 of the controller 2 that has received the check request command (check) and group ID (gid) to be checked refers to the operating condition database 252. The key information for referring to the operating condition is the check request command (check), and the CPU 22 inquires whether or not an IC tag matching the operating condition (check) is present in the group ID (gid) (2).

The CPU 22 aquires the tag ID (sid1) of an IC tag matching the operating condition (check), and a read request command (read) directed to the reader/writer 21a corresponding to the IC tag 1a including a temperature sensor (3). The CPU 22 transmits the read request command (read) and the tag ID (sid1) of an IC tag to be read to the communication unit 29 (4), and transmits the read request command (read) and the tag ID (sid1) of the IC tag to be read to the reader/writer 21a through the communication unit 29 (5).

According to the received read request command (read), the reader/writer 21a reads temperature data (data) from the IC tag 1a corresponding to the tag ID (sid1), and returns information (ok) indicting that reading has been completed correctly, the tag ID (sid1), and the read temperature data (data) to the communication unit 29 (6). The CPU 22 receives the information (ok) indicting that reading has been completed correctly, the tag ID (sid1), and the read temperature data (data) (7).

The CPU 22 temporarily stores the received temperature data (data) in the RAM 24 (8), and refers to the identification information database 251 by using the received tag ID (sid1) as the key information (9). The CPU 22 acquires the group ID (gid) corresponding to the tag ID (sid1) (10).

As shown in FIG. 5, the CPU 22 refers to the operating condition database 252 by using the group ID (gid) and the operating condition (auto) as key information (11). The CPU 22 acquires tag ID (sid2) matching the operating condition (auto), and a write request command (write) directed to the reader/writer 21b corresponding to an IC tag corresponding to the tag ID (sid2) (12).

The CPU 22 reads the temperature data (data) temporarily stored in the RAM 24 (13), and transmits it together with the acquired write request command (write) and the tag ID (sid2) of an IC tag subjected to writing to the communication unit 29 (14), and transmits the write request command (write), the tag ID (sid2) of the IC tag to be read, and temperature data (data) to the reader/writer 21b through the communication unit 29 (15).

According to the received write request command (write), the reader/writer 21b writes the temperature data (data) on the IC tag 1b corresponding to the tag ID (sid2), and returns information (ok) indicating that writing has been completed correctly and the tag ID (sid2) to the communication unit 29 (16). The CPU 22 receives the information (ok) indicating that writing has been completed correctly and the tag ID (sid2) (17). The CPU 22 finishes a sequence of processes by returning information (ok) indicating that a sequence of processes has been completed correctly and the group ID (gid) corresponding to the check request command (check) from the external application to the external application.

Figure 6:
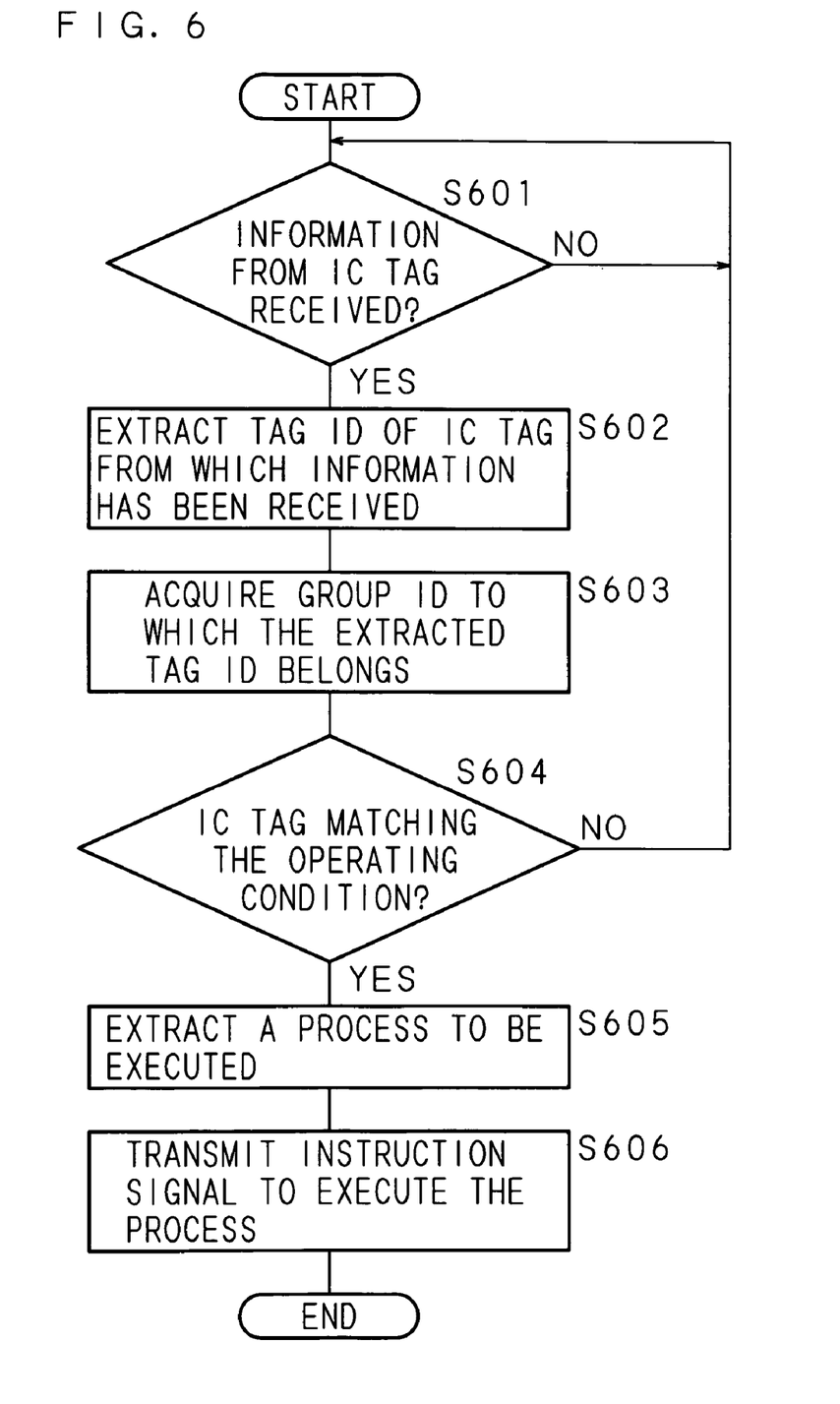
FIG. 6 is a view showing the processing steps of a CPU of the controller of Embodiment 1 of the present invention.

FIG. 6 is a view showing the processing steps of the CPU 22 of the controller 2 of Embodiment 1 of the present invention. The CPU 22 of the controller 2 determines whether or not the reader/writer 21 has received information from an IC tag (step S601). If the CPU 22 determines that the reader/writer 21 has received information from an IC tag (step S601: YES), the CPU 22 extracts the tag ID of the IC tag from which the information has been received (step S602), and refers to the identification information database 251 to acquire the group ID to which the IC tag belongs (step S603).

The CPU 22 refers to the operating condition database 252, and determines whether or not an IC tag whose operating condition is stored in association with operating condition ID corresponding to "the condition where tag ID in the same group was detected) is present in the IC tags belonging to the acquired group ID (step S604). If the CPU 22 determines that an IC tag whose operating condition is stored in association with the operating condition ID corresponding to "the condition where tag ID in the same group was detected) is present in the IC tags belonging to the acquired group ID (step S604: YES), the CPU 22 extracts a process to be executed by the IC tag from the operating condition database 252 (step S605), and transmits an instruction signal to execute the extracted process to the reader/writer 21 (step S606). If the CPU 22 determines that no IC tag whose operating condition is stored in association with the operating condition ID corresponding to "the condition where tag ID in the same group was detected" is present in the IC tags belonging to the acquired group ID (step S604: NO), the CPU 22 returns to step S601 and repeats the above-mentioned processes.

Thus, the grouped IC tags function as one IC tag for providing the function of "recording temperature" in response to the request, and do not depend on the external application. Moreover, even in the application of recording an event that needs to be monitored all the time other than recording of temperature, all we have to do is to change the kind of IC tag and the operating condition database, so that there is no need to largely change the structure of the external application. In other words, by transmitting a check request command (check) and the group ID (gid) of an object to be monitored, the application can record data on the IC tag including a memory just the same.

As described above, according to Embodiment 1, it is not necessary to create a program for controlling data transfer between IC tags, etc. from the external application, and it is possible to easily cause IC tags having a plurality of functions to function as one set of IC tags having complex functions by combining them.

Embodiment 2

The following description will explain the present invention, based on the drawings illustrating Embodiment 2 thereof. Since the structure of a memory product controller of Embodiment 2 of the present invention is the same as that of Embodiment 1, the detailed explanation is omitted by assigning the same reference codes. Embodiment 2 explains the case where the memory product controller is applied to reading and writing of data irregularly on tags, for example, to an impact monitoring system for products.

In an impact monitoring application for products, IC tags 1, 1, ... are actuated through the controller 2 of the memory product controller of Embodiment 2. The IC tags 1, 1, ... are RFID tags, and an active tag 1c including an impact sensor (a kind of tag that spontaneously transmits radio wave) and a tag 1d including a memory are grouped into one group.

A reader/writer 21c for reading/writing data on the active tag 1c including an impact sensor is mounted outside through the communication unit 29. When the impact sensor detects an impact load equal to or greater than a certain value, the reader/writer 21c receives impact data detected from the tag IC including an impact sensor. A reader/writer 21d for reading/writing data on the tag 1d including a memory can read and write data on the incorporated memory.

In the case where the CPU 22 receives a processing start command (start) from an external application, after the reception, the controller 2 records the impact data if an impact load equal or greater than the certain value is detected. The controller 2 returns information regarding whether or not the impact data has been recorded to the external application. The external application is a program for recording the history data about impact between the transmission of the processing start command (start) to the controller 2 and the transmission of a processing stop command (stop).

Figure 7:
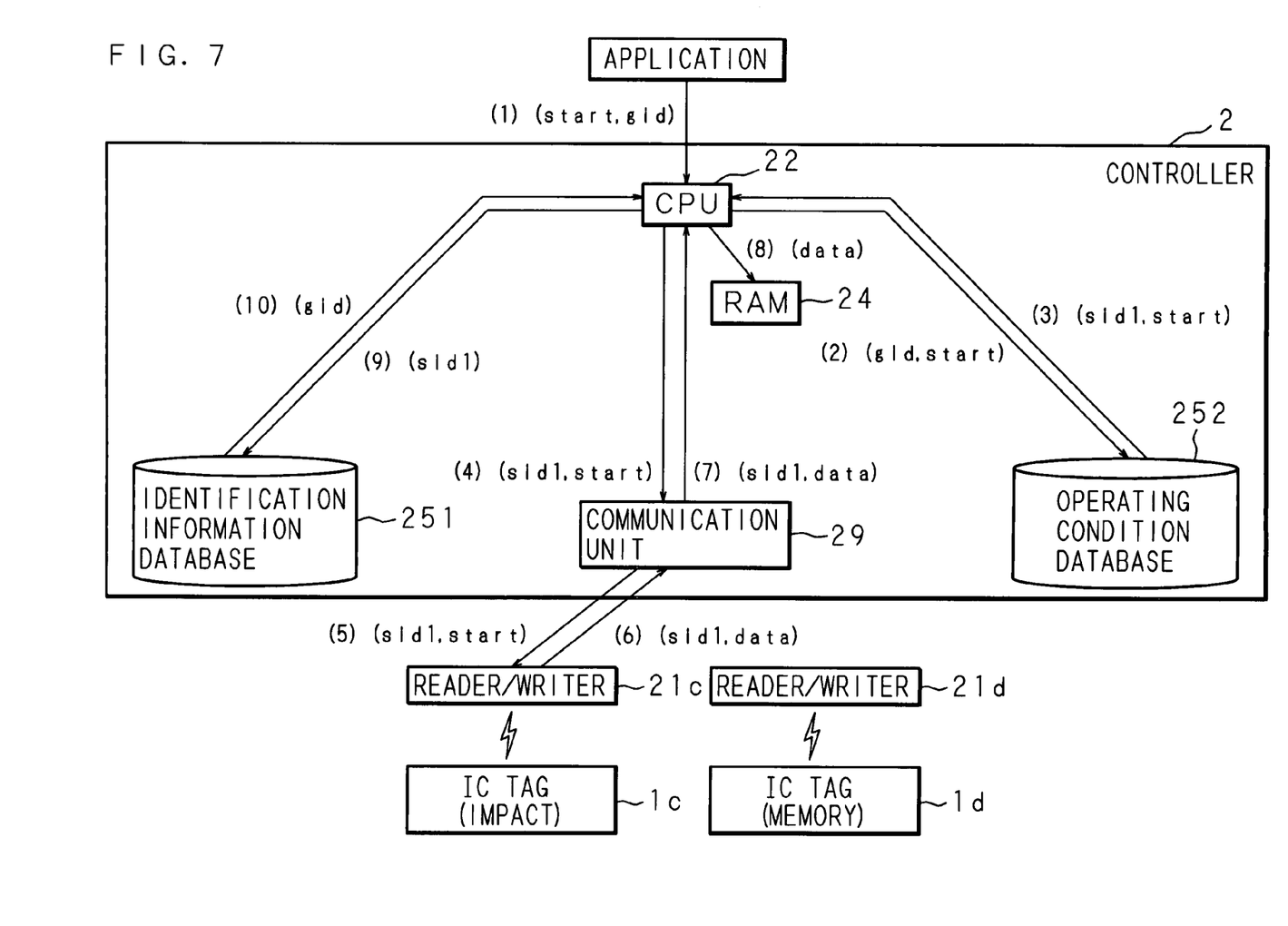
FIG. 7 is a view showing a dataflow in a memory product controller of Embodiment 2 of the present invention.
Figure 8:
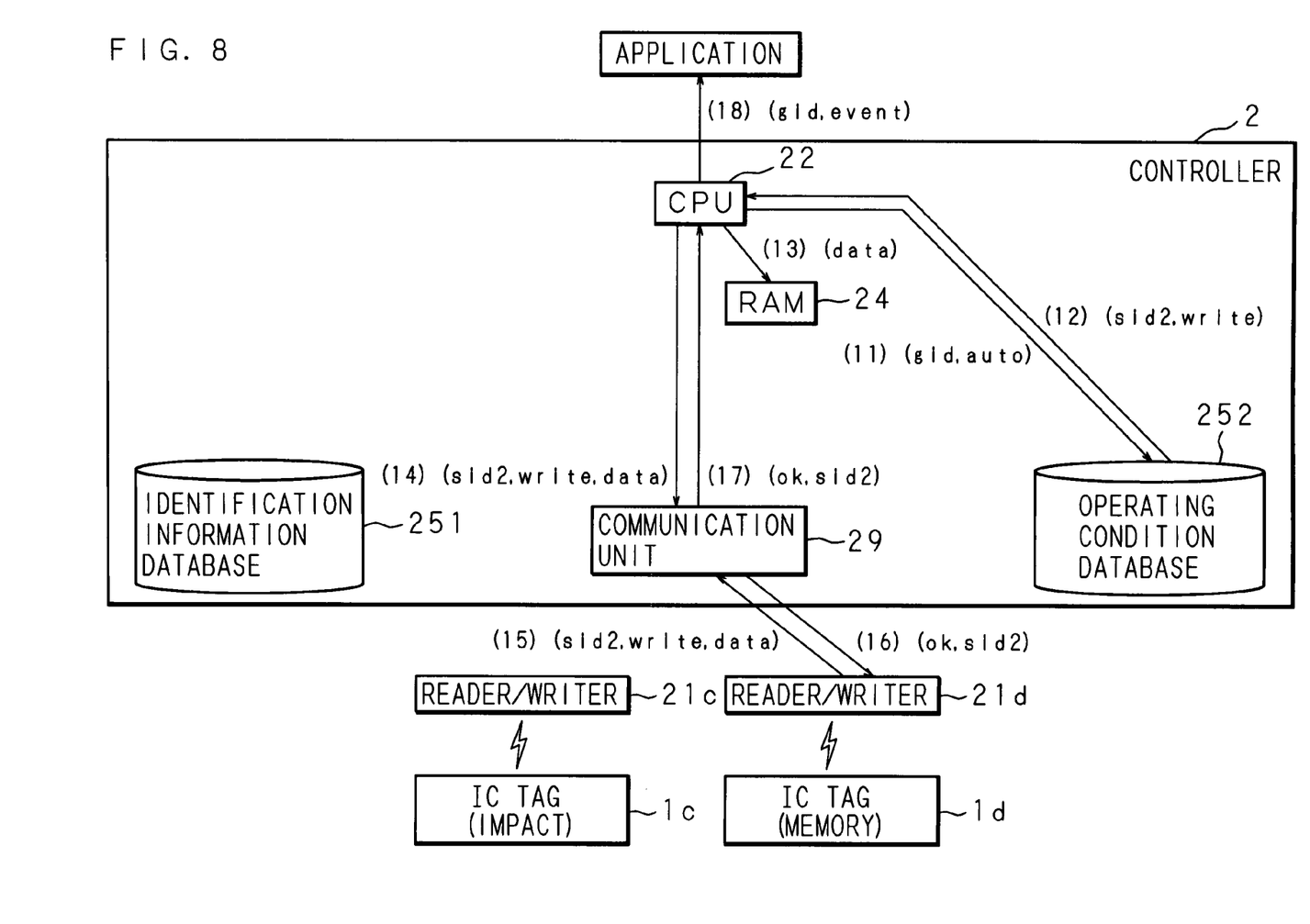
FIG. 8 is a view showing a dataflow in the memory product controller of Embodiment 2 of the present invention.

FIG. 7 and FIG. 8 are views showing a dataflow in the memory product controller of Embodiment 2 of the present invention. In FIG. 7 and FIG. 8, by assigning the same reference codes to those having the similar functions as in Embodiment 1, the detailed explanation is omitted.

sid1 is the tag ID of an IC tag including an impact sensor, sid2 is the tag ID of an IC tag including a memory, gid is the group ID to be assigned to the grouped tags, start is a processing start command from an external application, stop is a processing stop command from the external application, read/write is a read/write command directed to the reader/writer, and data is impact data read by the impact sensor. auto is a kind of command indicating the fact of reading data from a tag. event is a command indicating occurrence of record of data. The start, stop, read, write, and auto are used as operating condition ID of the operating condition database 252.

As shown in FIG. 7, the external application transmits a processing start command (start) and group ID (gid) to be monitored for impact to the controller 2 (1). The CPU 22 of the controller 2 that has received the processing start command (start) and group ID (gid) to be monitored for impact refers to the operating condition database 252. The key information for referring to the operating condition is the processing start command (start), and the CPU 22 inquires whether or not an IC tag matching the operating condition (start) is present in the group ID (gid) (2).

The CPU 22 aquires the tag ID (sid1) of an IC tag matching the operating condition (start) (3). The CPU 22 transmits a processing start command (start) and the tag ID (sid1) of an IC tag to be read to the communication unit 29 (4), and transmits the processing start command (start) and the tag ID (sid1) of the IC tag to be read to the reader/writer 21c through the communication unit 29 (5). After receiving the processing start command (start), the reader/writer 21c is in a stage capable of continuously receiving radio waves emitted by the active tag 1c including an impact sensor until it receives a processing start command (end).

When the active tag 1c including an impact sensor receives impact larger than a predetermined value, the reader/writer 21*c* reads the impact data (data) from an IC tag 1*c* corresponding to the tag ID (sid1), according to the received processing command (start), and returns the tag ID (sid1) and the read impact data (data) to the communication unit 29 (6). The CPU 22 receives the tag ID (sid1) and the read impact data (data) through the communication unit 29 (7).

The CPU 22 temporarily stores the received impact data (data) in the RAM 24 (8), and refers to the identification information database 251 by using the received tag ID (sid1) as key information (9). The CPU 22 aquires the group ID (gid) corresponding to the tag ID (sid1) (10).

As shown in FIG. 8, the CPU 22 refers to the operating condition database 252 by using the group ID (gid) and the operating condition (auto) as key information (11). The CPU 22 aquires tag ID (sid2) matching the operating condition, and a write request command (write) directed to the reader/writer 21*d* corresponding to an IC tag corresponding to the tag ID (sid2) (12).

The CPU 22 reads the impact data (data) temporarily stored in the RAM 24 (13), and transmits it together with the acquired write request command (write) and the tag ID (sid2) of an IC tag subjected to writing to the communication unit 29 (14), and transmits the write request command (read), the tag ID (sid2) of an IC tag to be read, and temperature data (data) to the reader/writer 21*d* through the communication unit 29 (15).

According to the received write request command (write), the reader/writer 21*d* writes impact data (data) to the IC tag 1*d* corresponding to the tag ID (sid2), and returns information (ok) indicating that writing has been completed correctly and the tag ID (sid2) to the communication unit 29 (16). The CPU 22 receives the information (ok) indicating that writing has been completed correctly and the tag ID (sid2) through the communication unit 29 (17). The CPU 22 transmits a command (event) indicating that the impact command has been recorded, and the group ID (gid) to be checked for the processing start command (start) to the external application. The above-described processing continues until the CPU 22 receives a processing stop command (stop).

Thus, the grouped IC tags function as one IC tag for providing the function "recording impact data" irregularly based on a certain criterion, and do not depend on the external application. Moreover, even in the application of recording an event that needs to be monitored all the time other than recording of impact data, all we have to do is to change the kind of IC tag and the operating condition database, so that there is no need to largely change the structure of the external application. In other words, by transmitting the processing start command (start) of a monitoring process and the group ID (gid), the application can record data on the IC tag including a memory just the same.

As described above, according to Embodiment 2, it is not necessary to create a program for controlling data transfer between IC tags, etc. from an external application, and it is possible to easily cause IC tags having a plurality of functions to function as one set of IC tags having complex functions by combining them.

Note that the kind of the sensor mentioned in Embodiments 1 and 2 is not limited to one kind, and it may be possible to construct a similar system by using various kinds of sensors, such as a tilt sensor and a brightness sensor.

By combining a plurality of kinds of sensors and storing the detection history on a tag including a memory, it is possible to easily construct an application using one tag having a multi-function sensor in appearance.

Further, the operating condition is not limited to receiving of information, and, for example, may detect the content of received information and construct the operating condition database 252 so as to specify an operating condition according to the detected content. For example, it may be possible to add a time specifying condition to the operating condition and construct a multi-function tag capable of switching a brightness sensor and a sound sensor according to a time zone, so that the present invention can be applied to various systems such as building a security system.

Embodiment 3

The following description will explain the present invention in detail, based on the drawings illustrating Embodiment 3 thereof. Since the structure of a memory product controller of Embodiment 3 of the present invention is the same as that of Embodiment 1, the detailed explanation is omitted by assigning the same reference codes. Embodiment 3 is characterized by a redundant structure where a plurality of IC tags 1, 1, . . . having the similar function are attached to a single object.

Figure 9:
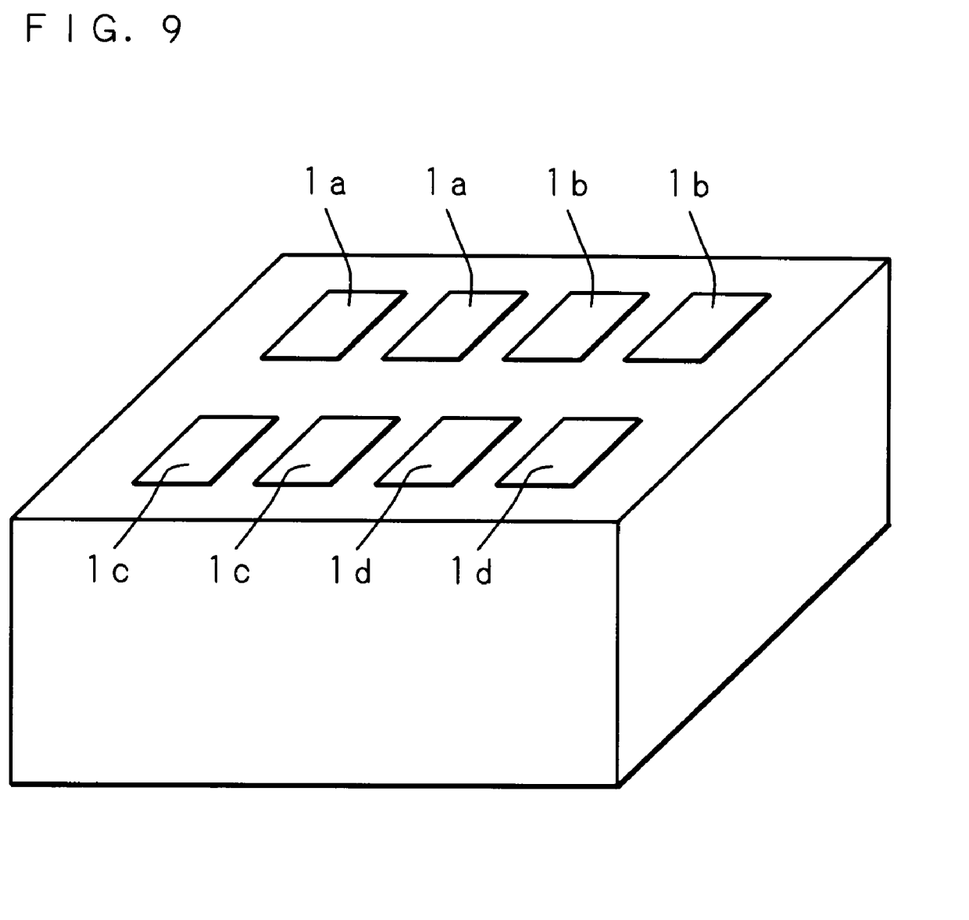
FIG. 9 is a view schematically showing an IC tag attaching method in a memory product controller of Embodiment 3 of the present invention.
Figure 10:
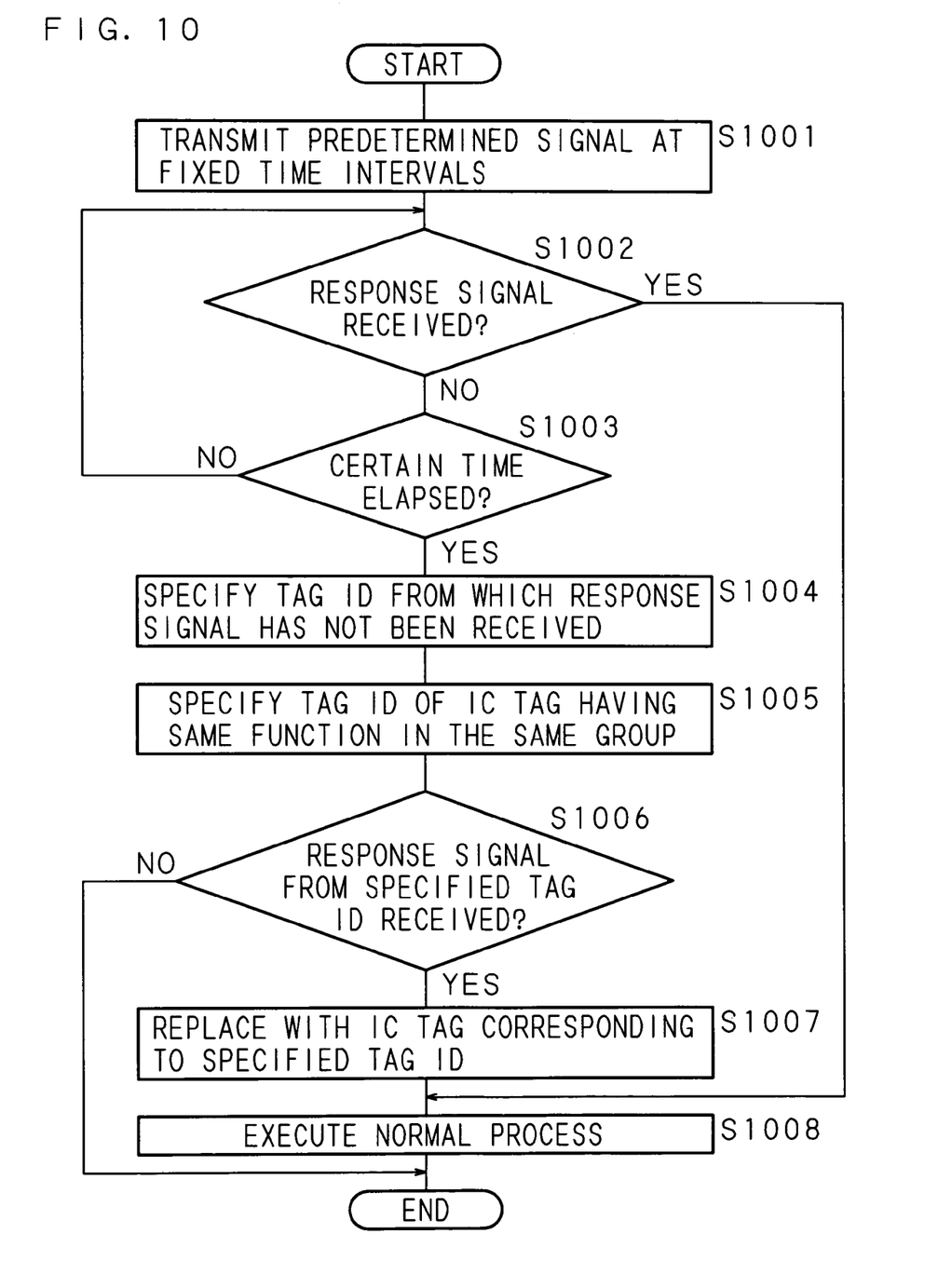
FIG. 10 is a flowchart showing the processing steps of a CPU of the controller of Embodiment 3 of the present invention.

FIG. 9 is a view schematically showing a method of attaching IC tags 1, 1, . . . according to the memory product controller of Embodiment 3 of the present invention, and FIG. 10 is a flowchart showing the processing steps of the CPU 22 of the controller 2 of Embodiment 3 of the present invention. Embodiment 3 is also explained by illustrating an example where the memory product controller is applied to a product conveyance management application.

In the example shown in FIG. 9, IC tags 1, 1, . . . to which a sensor is fastened are attached to a product to be conveyed. The IC tags 1, 1, . . . to be attached are eight IC tags of four types, including IC tags 1*a*, 1*a* to which an impact sensor is fastened, IC tags 1*b*, 1*b* to which a temperature sensor is fastened, IC tags 1*c*, 1*c* to which a tilt sensor is fastened, and IC tags 1*d*, 1*d* incorporating a memory capable of reading/writing data. Embodiment 3 differs from Embodiments 1 and 2 in that two or more IC tags having the similar function are attached to each product.

In the identification information database 251 of the controller 2, tag ID identifying each of the IC tags 1*a*, 1*a* to which an impact sensor is fastened, the IC tags 1*b*, 1*b* to which a temperature sensor is fastened, the IC tags 1*c*, 1*c* to which a tilt sensor is fastened, and the IC tags 1*d*, 1*d* incorporating a large-capacity memory capable of reading/writing data is added and stored in association with the group ID of these grouped IC tags 1, 1, . . . .

In the operating condition database 252, an operating condition and a process to be executed by the operation are stored for each tag ID. The sender of a product attaches two pieces of each of the IC tags 1*a* through 1*d* to the product before carrying out the product. For example, the IC tags are attached to each product, or a box, a case, etc. containing a plurality of products together. The controller 2 including the reader/writer 21 is mounted in a location where it is not much influenced by vibration of the conveying means, a temperature change, a tilt, etc., such as, for example, in a part of a carrier, a part of luggage room, and a part of container storing the product.

As shown in FIG. 10, the CPU 22 of the controller 2 transmits a predetermined signal, for example, a signal including a fixed value, to all the IC tags 1, 1, . . . at fixed time intervals through the reader/writer 21 (step S1001). A response signal to be received by the CPU 22 is, for example, a signal including the fixed value, a signal indicating that processing is not feasible, a signal indicating that the signal has been received, etc.

If the CPU 22 determines that a response signal has been received (step S1002: YES), the CPU 22 determines that the IC tags function correctly and executes the same process as in Embodiment 1 (step S1008). If the CPU 22 determines that a response signal has not been received (step S1002: NO), the CPU 22 determines whether or not a certain time has elapsed since the transmission of the predetermined signal (step S1003).

If the CPU 22 determines that the certain time has not elapsed (step S1003: NO), the CPU 22 returns to step S1002. On the other hand, if the CPU 22 determines that the certain time has elapsed (step S1003: YES), the CPU 22 specifies the tag ID of an IC tag from which it has not received a response signal (step S1004).

The CPU 22 refers to the identification information database 251, based on the specified IC tag as key information, and specifies the tag ID of other IC tag among a plurality of IC tags having the similar function (step S1005). The CPU 22 determines whether or not it has received a response signal from an IC tag corresponding to the specified tag ID (step S1006). If the CPU 22 determines that it has not received the response signal (step S1006; YES), the CPU 22 determines that the IC tag functions correctly, and replaces it for the IC tag that was determined not to function correctly (step S1007), and executes the same processing as in Embodiment 1 (step S1008).

If the CPU 22 determines that a response signal has not been received (step S1006: NO), it is preferred to stop transmitting instruction information to perform reading/writing to the IC tag that does not return a response signal. The reason for this is to prevent an erroneous operation due to erroneous information from an IC tag that cannot function correctly.

As described above, by including two or more IC tags having the similar function when grouping IC tags, it is possible to obtain redundant functions, and therefore, even when abnormality occurs in one IC tag and the IC tag cannot function correctly, it is possible to operate the application program correctly by switching to other IC tag having the similar function.

Embodiment 4

The following description will explain a wine temperature management system build by a memory product controller of Embodiment 4 of the present invention. Since the structure of the memory product controller of Embodiment 4 is the same as that of Embodiment 1, the detailed explanation is omitted by assigning the similar reference codes. Embodiment 4 is characterized by a wine temperature management system capable of finely managing the temperature at a low cost by combining Embodiment 1 with the attachment position of an IC tag.

The wine has a characteristic that its quality deteriorates largely with a change in temperature. Therefore, strict temperature management is required in the shipping process. The wine temperature management system of Embodiment 4 can guarantee, at a lower cost compared to a conventional system, that an individual bottle of wine is the wine shipped under appropriate temperature management.

Temperature management systems using an IC tag and a temperature sensor have employed the following two methods. In one method, a tag including a memory is attached to an individual bottle of wine, a temperature sensor is disposed near a reader/writer, and the value read by the temperature sensor is written periodically on an individual tag. In the other method, a tag including a temperature sensor is attached to an individual bottle of wine, and a temperature management application records the value read by the temperature sensor and the value of the tag ID as history information.

On the other hand, Embodiment 4 uses a tag including a memory attached to an individual bottle of wine, and a tag including a temperature sensor attached to a wine case. Then, the tag including a temperature sensor attached to the wine case and the tag including a memory attached to an individual bottle of wine in the case are virtually handled as one tag by the same method as in Embodiment 1.

The sender of wine attaches a tag including a memory to an individual bottle of wine, and stores it in a wine case to which a tag including a temperature sensor is attached. The plurality of tags are grouped and registered as one virtual tag.

During the conveyance of wine, data read by the temperature sensor attached to the wine case is periodically written on the tag including a memory attached to an individual bottle of wine. The temperature history during the conveyance is recorded in the tag including a memory attached to an individual bottle of wine, and the group registration is cancelled when the wine arrives at the destination.

At the destination, it is possible to determine, based on the temperature history recorded in the tag including a memory, whether or not appropriate temperature management was performed. Moreover, a consumer who purchased the wine can obtain the temperature management information about the wine, based on the temperature history recorded in the tag including a memory attached to the purchased wine. The tag including a temperature sensor attached to the wine case is returned in a state being attached to the wine case to the sender for reuse.

With the conventional method in which a temperature sensor is attached near a reader/writer, there is a possibility that the position of the temperature sensor and the position of wine may be too far from each other if the wine is stored in a large warehouse, and therefore it is not always the case that the tag indicates a correct temperature of the wine. On the other hand, in Embodiment 4, since the temperature sensor is attached to a wine case adjacent to the position of wine, it is possible to detect a temperature almost equal to the temperature of wine, and it is possible to accurately manage the temperature of wine. Besides, it is not necessary to attach a tag including a temperature sensor to all bottles of wine, and it is possible to reuse the expensive tag including a temperature sensor. Thus, when the tag is used for a long period of time, it is possible to build a temperature management system capable of largely reducing the running cost.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A memory product controller, which groups a plurality of non-contact type memory products and controls operations of the memory products to realize a predetermined function, comprising:

a group registration unit for storing information identifying a memory product in association with information identifying a group;

an operating condition storage unit for storing the information identifying a memory product, an operating condition of the memory product, and information indicating to perform either reading or writing on the memory product when the controller determines that the memory product is on the operating condition, in association with the information identifying a group;

a reader/writer for a memory product;

means for referring to the operating condition storage unit, when reading/writing is performed on one memory product belonging to a predetermined group by the reader/writer, by using the information identifying said one memory product on which reading/writing was performed as key information, and determining whether or not other memory products having the similar operating condition is present in the same group; and means for transmitting instruction information to perform reading or writing on one or a plurality of other memory products belonging to the same group and having the similar operating condition to the reader/writer when said means determines that other memory products having the similar operating condition are present.

2. The memory product controller of claim 1, wherein a plurality of sets of memory products, as one set consisting of two or more memory products having the similar function, are grouped, and the memory product controller comprises:

means for transmitting a predetermined signal to memory products through the reader/writer;

determining means for determining whether or not there is a response to the transmitted signal from each memory product; and means for transmitting to the reader/writer instruction information to perform reading or writing on other memory products belonging to the same set as one memory product determined to be non-responsive by the determining means.

3. The memory product controller of claim 2, comprising means for stopping transmission of instruction information to perform reading or writing on memory products determined to be non-responsive by the determining means.

4. A memory product controller, which groups a plurality of non-contact type memory products and controls operations of the memory products to realize a predetermined function, comprising:

a group registration unit for storing information identifying a memory product in association with information identifying a group;

an operating condition storage unit for storing the information identifying a memory product, an operating condition of the memory product, and information indicating to perform either reading or writing on the memory product when the controller determines that the memory product is on the operating condition, in association with the information identifying a group;

a reader/writer for a memory product; and a processor capable of performing the operations of:

referring to the operating condition storage unit, if reading/writing is performed on one memory product belonging to a predetermined group by the reader/writer, by using the information identifying said one memory product on which reading/writing is performed as key information, and determining whether or not other memory products having the similar operating condition are present in the same group; and transmitting instruction information to perform reading or writing on one or a plurality of other memory products belonging to the same group and having the similar operating condition to the reader/writer when a determination is made that other memory products having the similar operating condition are present in the same group.

5. The memory product controller of claim 4, wherein a plurality of sets of memory products, as one set consisting of two or more memory products having the similar function, are grouped, and the processor is further capable of performing the operations of transmitting a predetermined signal to memory products through the reader/writer;

determining whether or not there is a response to the transmitted signal from each memory product; and transmitting to the reader/writer instruction information to perform reading or writing on other memory products belonging to the same set as one memory product determined to be non-responsive.

6. The memory product controller of claim 5, wherein the processor is further capable of performing the operations of stopping transmission of instruction information to perform reading or writing on a memory product determined to be non-responsive.

7. A memory product control method using a computer which groups a plurality of non-contact type memory products and controls operations of the memory products to realize a predetermined function, comprising the steps of:

storing information identifying a memory product in association with information identifying a group;

storing the information identifying a memory product, an operating condition of the memory product, and information indicating to perform either reading or writing on the memory product when the memory product is determined that it is on the operating condition, in association with the information identifying a group;

determining whether or not other memory products having the similar operating condition is stored in the same group, when reading/writing is performed on one memory product belonging to a predetermined group by a reader/writer for a memory product, by using the information identifying said one memory product on which reading/writing is performed as key information; and transmitting instruction information to perform reading or writing on one or a plurality of other memory products belonging to the same group and having the similar operating condition to the reader/writer, when a determination is made that other memory products having the similar operating condition are stored in the same group.

8. The memory product control method of claim 7, further comprising the steps of:

grouping a plurality of sets of memory products, as one set consisting of two or more memory products having the similar function;

transmitting a predetermined signal to memory products through the reader/writer;

determining whether or not there is a response to the transmitted signal from each memory product; and transmitting to the reader/writer instruction information to perform reading or writing on other memory products belonging to the same set as one memory product determined to be non-responsive.

9. The memory product control method of claim 8, further comprising the step of stopping transmission of instruction information to perform reading or writing on a memory product determined to be non-responsive.

10. A memory product storing a computer program for a computer, the computer including:

a group registration unit for storing information identifying a memory product in association with information identifying a group; and an operating condition storage unit for storing the information identifying a memory product, an operating condition of the memory product, and information indicating to perform either reading or writing on the memory product when the memory product is determined that it is on the operating condition, in association with the information identifying a group, wherein a plurality of non-contact type memory products are grouped, and operations of the memory products are controlled to realize a predetermined function, and the computer program comprises the steps of:

causing the computer to refer to the operating condition storage unit, when reading/writing is performed on one memory product belonging to a predetermined group by a reader/writer for a memory product, by using the information identifying said one memory product on which reading/writing was performed as key information and determine whether or not other memory products having the similar operating condition are present in the same group; and causing the computer to transmit to the reader/writer instruction information to perform reading or writing on one or a plurality of other memory products belonging to the same group and having the similar operating condition, when a determination is made that other memory products having the similar operating condition are present in the same group.

11. The memory product of claim 10, wherein the computer program comprises the steps of:

causing the computer to group and store a plurality of sets of memory products, as one set consisting of two or more memory products having the similar function;

causing the computer to transmit a predetermined signal to memory products through the reader/writer;

causing the computer to determine whether or not there is a response to the transmitted signal from each memory product; and causing the computer to transmit to the reader/writer instruction information to perform reading or writing on other memory products belonging to the same set as one memory product determined to be non-responsive.

12. The memory product of claim 11, wherein the computer program further comprises the step of causing the computer to stop transmission of instruction information to perform reading or writing on a memory product determined to be non-responsive.

* * * * *